(12) United States Patent
Suto et al.

(10) Patent No.: US 7,169,457 B2
(45) Date of Patent: Jan. 30, 2007

(54) COMPOSITION FOR MATTE LAYER FORMATION, RELEASE SHEET USING THE SAME, AND THE SYNTHETIC LEATHER PRODUCED USING SAID RELEASE SHEET

(75) Inventors: Kenichiro Suto, Shinjuku-Ku (JP); Yoshiki Kawagoe, Yokohama (JP); Hiroshi Watanabe, Yokohama (JP); Takeshi Kubota, Shinjuku-Ku (JP); Koichiro Matsudaira, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/328,188

(22) Filed: Dec. 26, 2002

(65) Prior Publication Data

US 2004/0062913 A1    Apr. 1, 2004

(30) Foreign Application Priority Data

Sep. 27, 2002    (JP)    ............................... 2002-283538

(51) Int. Cl.
    *D06N 3/00*    (2006.01)
(52) U.S. Cl. ..................... 428/141; 428/151; 428/904
(58) Field of Classification Search ................ 428/141, 428/143, 147, 149, 150, 151, 156, 167, 168, 428/172, 173, 473, 904; 425/406; 264/220, 264/299, 300; 101/401.1, 401.2
    See application file for complete search history.

(56) References Cited

U.S. PATENT DOCUMENTS 6,077,472 A * 6/2000 Kataoka et al. ............. 264/338
6,733,864 B1 * 5/2004 Kubota ....................... 428/151

FOREIGN PATENT DOCUMENTS

WO    WO 01/20073    * 3/2001

OTHER PUBLICATIONS

Merriam-Webster Online Dictionary, www.mwrriamwebster.com.*

* cited by examiner

*Primary Examiner*—Alicia Chevalier
(74) *Attorney, Agent, or Firm*—Oliff & Berridge, PLC

(57) ABSTRACT

There are provided a composition for matte layer formation suitable for the production of a matte synthetic leather having a matte surface with a high level of jet-blackness even without the practice of embossing, raising, etc., and a release sheet for the production of a matte synthetic leather by using the composition. The composition for matte layer formation suitable for the production of a matte synthetic leather comprises a thermosetting resin and a matting agent as indispensable components. The matting agent comprises one or at least two types of organic or/and inorganic porous fine particles. The porous fine particles have a mean particle diameter in the range of 0.5 to 20 μm and a specific surface area in the range of 1 to 1000 $m^2/g$. The release sheet is produced by using the composition.

8 Claims, 4 Drawing Sheets

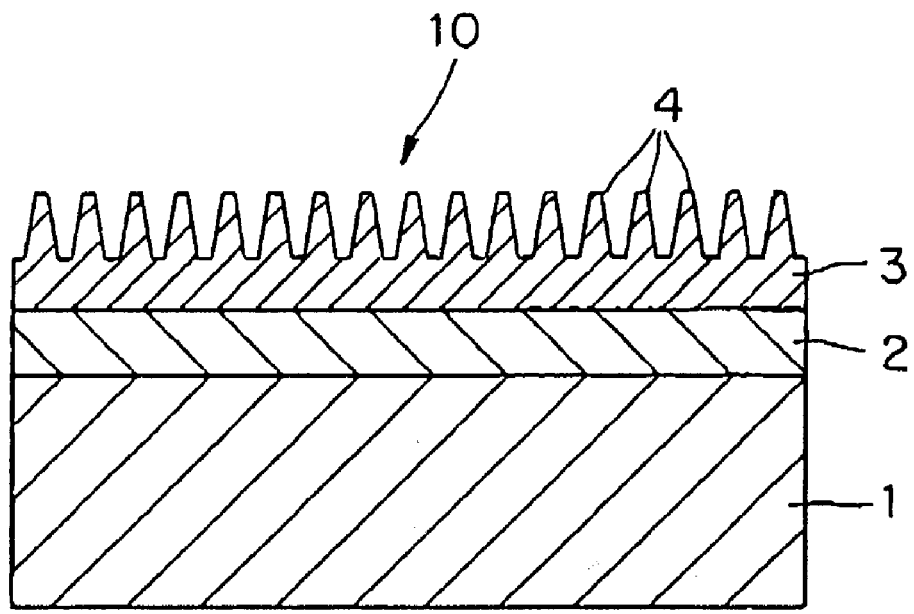
F I G. 1
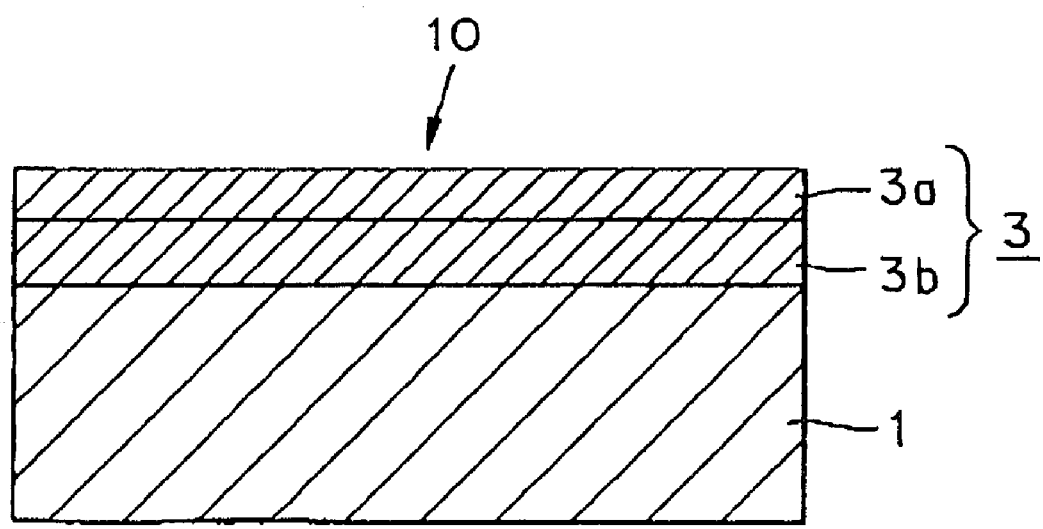
F I G. 2

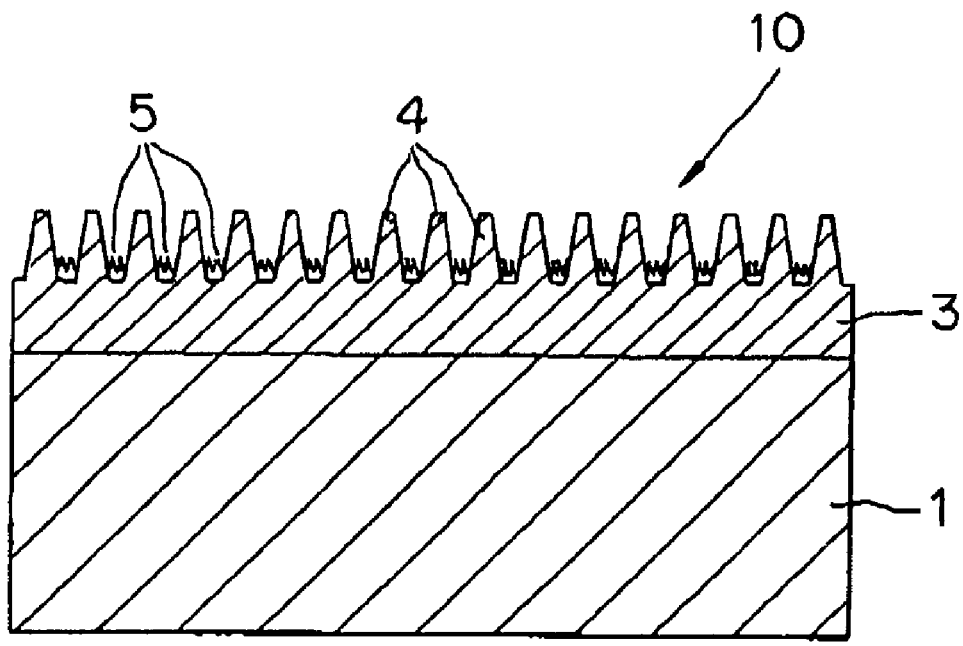
F I G. 4
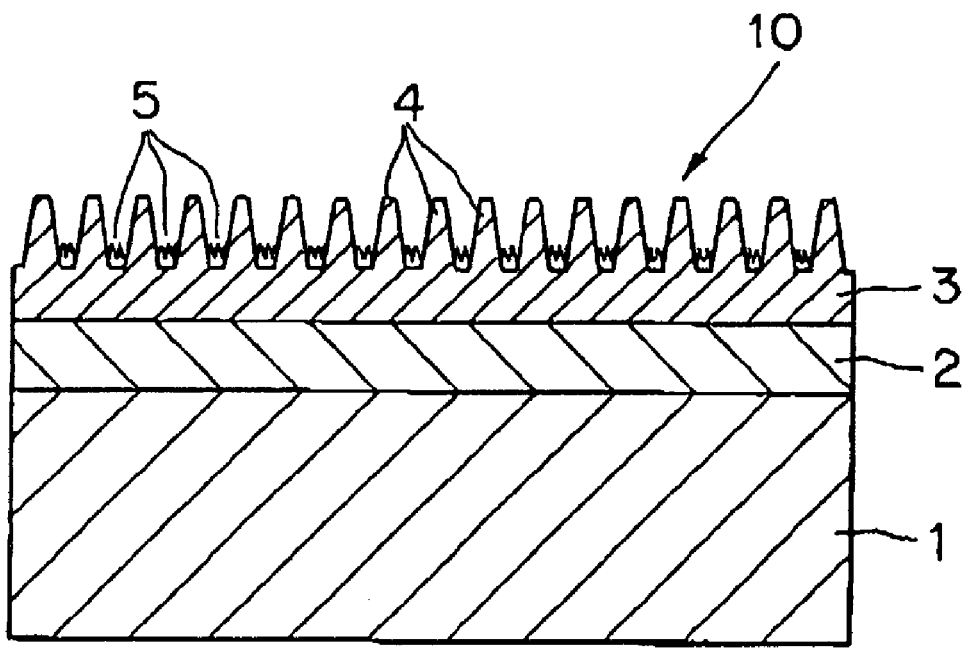
F I G. 5

COMPOSITION FOR MATTE LAYER FORMATION, RELEASE SHEET USING THE SAME, AND THE SYNTHETIC LEATHER PRODUCED USING SAID RELEASE SHEET

BACKGROUND OF THE INVENTION

1. Field of the Invention

The present invention relates to a release sheet for the production of a matte synthetic leather and a composition for the formation of the sheet. More particularly, the present invention relates to a composition for matte layer formation suitable for the production of a matte synthetic leather, which has a matte surface with a high level of jet-blackness without the practice of embossing, raising or the like, and a release sheet for the production of a matte synthetic leather using the composition.

2. Prior Art

According to one of conventional production processes of synthetic leathers, a synthetic leather is produced by coating a composition for a synthetic leather, for example, a urethane resin, a vinyl chloride resin, a polyamide resin, or an amino acid resin, on a release sheet, drying or curing the synthetic leather coating, coating an adhesive onto the dried or cured coating, laminating a backing fabric, such as a woven fabric, onto the adhesive coating, and then separating the release sheet from the synthetic leather composition coating. In this production process of a synthetic leather, synthetic leathers having various surface shapes can be produced by regulating the surface form of the release sheet. Specifically, since the surface shape of the synthetic leather is formed by transferring the surface form of the release sheet onto the synthetic leather, the regulation of the surface form of the release sheet is necessary for the production of a desired synthetic leather.

One property required of synthetic leathers, particularly matte synthetic leathers, is freedom from a faded color and is to be jet-black, that is, is to be matte.

For example, the following methods are known for the production of these matte synthetic leathers. Specifically, in a conventional method, a release sheet having concaves and convexes on its surface is produced, for example, by utilizing an emboss roll as a chill roll in the step of extrusion lamination in the production of the release sheet or by utilizing an emboss roll as a chill roll in the step of forming an application film in the case of the formation of the release sheet by the application of an existing film, and the concave/convex shape of the surface of the release sheet is transferred onto a synthetic leather. In another conventional method, a release sheet with an emboss of concaves and convexes is prepared by embossing the whole release sheet, and the concave/convex shape of the surface of the release sheet is transferred onto a synthetic leather. In a further conventional method, a synthetic leather having a matte surface is produced by subjecting a synthetic leather to raising.

The synthetic leathers produced by these methods are suitably matte. Since, however, the shape of fine concaves and convexes cannot be imparted by the embossing and the like, satisfactory jet-blackness cannot be realized in synthetic leathers having a deep color, for example, a black color. Further, in the methods wherein raising or the like is carried out, a step should be additionally provided. This renders the production process complicate and incurs increased cost.

On the other hand, as described in Japanese Patent Laid-Open No. 158249/1985, a method for producing a matte synthetic leather, i.e., the so-called "synthetic leather with a matte tone," has been developed wherein a composition for a release sheet with an inorganic pigment, such as silica or calcium carbonate, or a matting wax as a matting agent added thereto is coated onto a substrate to form a release sheet.

In the release sheet formed by coating the composition with a matting agent added thereto, however, the addition of a predetermined amount of an inorganic pigment or the like to the composition is necessary for attaining satisfactory matte effect. However, when the amount of this additive added to the composition is excessively large, the so-called "drop of particles" wherein the matting agent is dropped from the release sheet takes place.

Further, increasing the amount of the matting agent added for improving the matte effect causes aggregation of matting agent particles, and the matting agent disadvantageously bleeds out on the surface of the release sheet. Therefore, a release sheet having desired fine concaves and convexes cannot be formed, and, further, a synthetic leather, which is matte and is jet-black, cannot be produced.

Further, in the composition, for a release sheet, containing fine particles for matting purposes described in Japanese Patent Laid-Open No. 158249/1985 noted above, the incorporation of the fine particles can impart a matte feel to some extent. However, it is difficult to provide a synthetic leather which is jet-black without color fading.

The production of a matte synthetic leather by the conventional methods involves, besides the above problems, an additional problem that the addition of fine particles, which should be used as a matting agent for the production of a matte synthetic leather, to the composition for a release sheet deteriorates the fluidity of the composition and thus deteriorates the coatability of the composition.

Further, coating of a coating liquid onto a substrate having low smoothness to form a release sheet poses problems of deteriorated drying properties and lowered smoothness of the release sheet due to drying by strong heating.

When conventional paper is used as the substrate, static electricity is likely to be generated at the time of the formation of a release sheet. Further, in the production of a synthetic leather using this release sheet, since the step of separating the synthetic leather from the release sheet should be provided, the generation of static electricity is unavoidable. Thus, the generation of static electricity, for example, at the time of the production of a release sheet poses a problem of cracking of the surface of the release sheet and the synthetic leather.

Accordingly, an object of the present invention is to provide a composition for matte layer formation suitable for the production of a matte synthetic leather, which has a matte surface with a high level of jet-blackness without the practice of embossing, raising or the like, and a release sheet for the production of a matte synthetic leather using the composition.

Another object of the present invention is to provide a release sheet for the production of a matte synthetic leather, which release sheet has excellent smoothness and can realize the production of a good synthetic leather free from defects such as cracking by virtue of the suppression of the generation of static electricity.

SUMMARY OF THE INVENTION

In order to attain the above objects of the present invention, according to one aspect of the present invention, there is provided a composition for matte layer formation, comprising a thermosetting resin and a matting agent as indispensable components, said matting agent comprising one or at least two types of organic or/and inorganic porous fine particles, said porous fine particles having a mean particle diameter in the range of 0.5 to 20 µm and a specific surface area in the range of 1 to 1,000 m$^2$/g. The production of a release sheet by using the composition containing a matting agent comprising such fine particles can realize the production of a synthetic leather with a matte tone which is jet-black without color fading.

In a preferred embodiment of the present invention, the porous fine particles have been surface treated and have been homogeneously dispersed in the composition for matte layer formation. More preferably, when the thermosetting resin is soluble in water, the surface treatment is inorganic surface treatment, while, when the thermosetting resin is nonaqueous, the surface treatment is organic surface treatment. The use of the fine particles subjected to inorganic or organic surface treatment as the matting agent can improve the dispersibility of the fine particles in a coating liquid for matte layer formation. Therefore, even when the content of the fine particles in the coating liquid is increased, the coatability of the coating liquid is not deteriorated. Further, since the fine particles are homogeneously dispersed in the coating liquid, the coating liquid can form a matte layer having an even convex-concave surface.

Further, more preferably, the content of the porous fine particles in the composition for matte layer formation is 5 to 50% by weight. When the content of the fine particles is in the above-defined range, a matte synthetic leather can be produced which is uniform and has a high level of jet-blackness. Particularly preferably, the porous fine particles are selected from silica, calcium carbonate, talc, and a mixture containing at least one of said materials.

In a preferred embodiment, the composition for matte layer formation according to the present invention further contains a release agent. The incorporation of the release agent in the composition for matte layer formation can lower peeling resistance at the time of the separation of the release sheet from the synthetic leather. Therefore, the release sheet can be easily separated from the synthetic leather.

According to another aspect of the present invention, there is provided a first embodiment of the release sheet for the production of a synthetic leather according to the present invention, that is, a release sheet for the production of a synthetic leather, comprising: a matte layer formed by coating the above composition for matte layer formation; and a substrate for supporting the matte layer, said matte layer having a fine concave-convex portion on its surface, said concave-convex portion having an arithmetical mean roughness (Ra) of 0.5 to 15 µm. The use of a release sheet having this surface shape can realize the production of a matte synthetic leather without the use of means such as embossing or raising.

According to still another aspect of the present invention, there is provided a second embodiment of the release sheet for the production of a synthetic leather according to the present invention, that is, a release sheet for the production of a synthetic leather, comprising: a matte layer having fine concaves and convexes on its surface; and a substrate for supporting the matte layer, said matte layer comprising a releasable resin layer, a releasable transparent resin being provided so as to stay on the bottom of the concaves in the concave-convex portion. The production of a synthetic leather using this release sheet can more reliably impart peach skin-like appearance and feel to the surface of the synthetic leather. Further, even in the repetition of the production of synthetic leathers with different colors, since the releasable transparent synthetic resin stays on the bottom of the concaves in the fine concaves and convexes, the release sheet has excellent releasability. Therefore, the release sheet can be repeatedly used.

Further, in a preferred embodiment, the concave-convex portion has an arithmetical mean roughness (Ra) of 0.5 to 15 µm, the mean spacing of profile irregularities (concaves and convexes) (Sm) in the concave-convex portion is 0.5 to 10 µm, and the mean inclination (θa) of said concaves and convexes is 45 degrees $\leq$ θa <90 degrees. The matte layer having this concave-convex surface can be formed by coating the above composition for matte layer formation.

In the above first and second embodiments of the release sheet for the production of a synthetic leather, a smoothing layer is preferably provided between the matte layer and the substrate. The provision of the smoothing layer on the substrate can realize the production of a release sheet having a uniform fine concave-convex surface without the influence of the surface of the substrate.

More preferably, the smoothing layer has been formed using a composition having the same formulation as the above composition for matte layer formation except that the porous fine particles are absent in the composition. The use of this composition as the composition for smoothing layer formation can form a smoothing layer which has increased adhesion to the matte layer and thus can prevent interlaminar peeling. In particular, the incorporation of a leveling agent in the smoothing layer can further improve the smoothness.

According to a further aspect of the present invention, there is provided a third embodiment of the release sheet for the production of a synthetic leather according to the present invention, that is, a release sheet for the production of a synthetic leather, said release sheet comprising: a matte layer formed by coating the above composition for matte layer formation; and a substrate for supporting the matte layer, wherein said matte layer is a releasable resin layer having a multilayer structure of at least two layers, all the releasable resin layers constituting the multilayered matte layer except for at least the layer in contact with the surface of the substrate contain a release agent comprising a silicone-modified resin or a silicone-containing resin composition, and the content of the release agent is larger as the releasable resin layer is closer to the surface of the matte layer. The adoption of a multilayer structure of two or more layers in the releasable resin layer is advantageous in that, even when the thickness of the releasable resin layer should be increased due to low smoothness of the substrate, the thickness of each layer can be reduced and, at the same time, the layer near the substrate side can further improve the smoothness. Therefore, a lot of time is not required for drying the coating liquid. Further, in the layers other than the layer in contact with the substrate, since the mixing ratio of the silicone-modified resin or silicone increases as the layer is closer to the surface of the release sheet, a release sheet having excellent smoothness can be produced without sacrificing the adhesion between the layers.

In the release sheet for the production of a synthetic leather in each embodiment of the present invention, the surface resistivity of the substrate is preferably not more than $1.0 \times 10^{12}$ Ω. More preferably, the substrate contains an organic polymeric conductive agent and/or an inorganic conductive agent, or has, on any one side thereof, a coating of the organic polymeric conductive agent and/or the inorganic conductive agent, and the content of the conductive agent is in the range of 0.05 to 3.00 g/m$^2$ based on the substrate. When the substrate has the above resistivity, the occurrence of static electricity can be prevented at the time of the production of a release sheet and at the time of the production of a synthetic leather using the release sheet.

According to another aspect of the present invention, there is provided a synthetic leather using the release sheet.

In a preferred embodiment, the synthetic leather of the present invention has been produced substantially without the practice of embossing or/and raising.

According to a further aspect of the present invention, there is provided a synthetic leather produced by using a release sheet, said synthetic leather having a surface arithmetical roughness (Ra) of 0.5 to 15 μm and a 85-degree glossiness of 0.5 to 10%.

BRIEF DESCRIPTION OF THE DRAWINGS

FIG. 1 is a typical cross-sectional view showing a first embodiment of the release sheet for the production of a synthetic leather according to the present invention;

FIG. 2 is a typical cross-sectional view showing a second embodiment of the release sheet for the production of a synthetic leather according to the present invention;

FIG. 4 is a typical cross-sectional view showing an example of the third embodiment of the release sheet for the production of a synthetic leather according to the present invention;

FIG. 5 is a typical cross-sectional view showing another example of the third embodiment of the release sheet for the production of a synthetic leather according to the present invention;

DETAILED DESCRIPTION OF THE INVENTION

Figure 3:
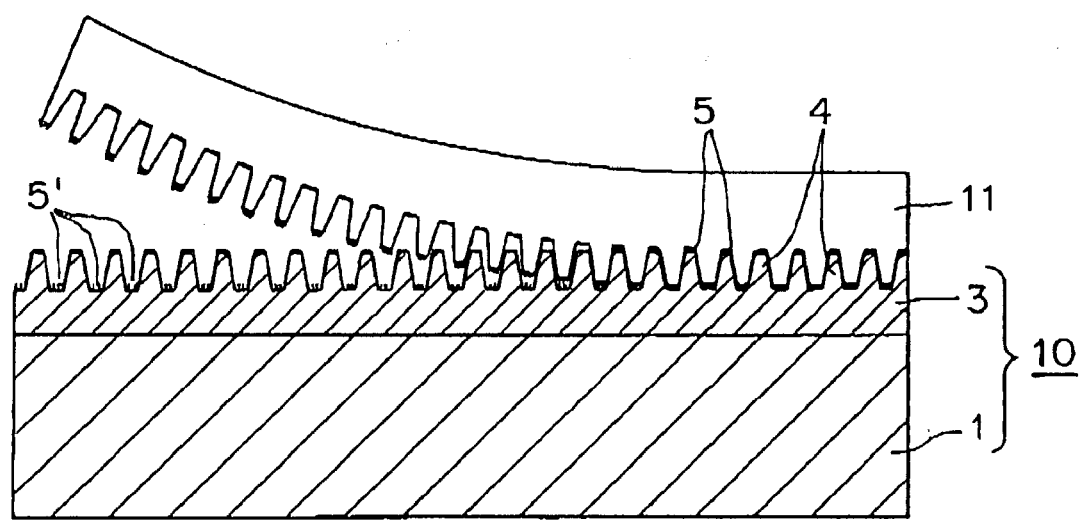
FIG. 3 is a typical cross-sectional view of a principal part illustrating a synthetic leather production process using a third embodiment of the release sheet for the production of a synthetic leather according to the present invention.

Embodiments of the present invention will be described in more detail with reference to the accompanying drawings.

The composition for the formation of a matte layer in a release sheet according to the present invention will be first described. The composition for matte layer formation according to the present invention comprises a thermosetting resin and a matting agent as indispensable components. The matting agent comprises inorganic or organic porous fine particles. Inorganic fine particles include fine particles of calcium carbonate, kaolin, talc, clay, titanium oxide, zinc oxide, silica, alumina, magnesium hydroxide, aluminum hydroxide and the like. Organic fine particles include fine particles of melamine resin, polystyrene, polypropylene, ethylene tetrafluoride resin, silicone resin, starch, acrylic resin and the like. Since, however, the release sheet used in the production of synthetic leathers is in many cases used under high temperature conditions, the use of inorganic fine particles is suitable because of their excellent heat resistance. Among these inorganic fine particles, silica, calcium carbonate, and talc are preferred because, as described later, the specific surface area and the particle diameter each can be easily regulated as desired. Silica is particularly preferred.

These fine particles should be porous. Specifically, in the present invention, fine particles having a specific surface area of 1 to 1,000 m$^2$/g are used. The pore diameter of the porous fine particles is about 50 to 500 angstroms. Assuming that the particle diameter of the fine particles is identical, the specific surface area depends upon the pore diameter and the number of pores. That is, the specific surface area increases with reducing the pore diameter and increasing the number of pores. In the porous fine particles having the above specific surface area, that is, a specific pore diameter and a specific number of pores, as the matting agent, light is irregularly reflected from pore portions formed on the surface of the fine particles. Therefore, a synthetic leather onto which this surface shape has been transferred is jet-black and is not seen as a faded color. On the other hand, in the case of fine particles having a diameter of several μm, light scattering is mainly Mie scattering. Since, however, the Mie scattering does not depend upon the wavelength, the object is seen white. For this reason, in synthetic leathers using a release sheet containing conventional fine particles, the surface is considered to be seen as a faded color. By contrast, in the release sheet according to the present invention, by virtue of the incorporation of the above porous fine particles in the release sheet, light is also scattered in the pore portion (pore diameter: several tens of angstroms to several hundreds of angstroms) of the fine particles. This scattering is mainly Rayleigh scattering. In the Rayleigh scattering, the intensity of scattered light depends upon the wavelength, and the viewer observes both light scattered by Rayleigh scattering and light scattered by Mie scattering. It is considered that, for the above reason, synthetic leathers produced using the release sheet according to the present invention have a matte surface which is jet-black and does not show faded color.

The specific surface area is preferably 10 to 500 m$^2$/g, more preferably 100 to 200 m$^2$/g. When the specific surface area is less than 1 m$^2$/g, the number of pores present per fine particle is so small that irregular reflection effect cannot be expected. On the other hand, when the specific surface area of the fine particles exceeds 1,000 m$^2$/g, the pore diameter is so small that irregular reflection of light does not occur. Further, when a coating liquid containing porous fine particles having the above size is used, the ingredients and the solvent component in the coating liquid are moderately absorbed into the pores of the fine particles. Therefore, even when fine particles in a desired amount are incorporated in the coating liquid, the coatability of the coating liquid is not deteriorated and an even coating can be formed.

The fine particles used in the composition for matte layer formation according to the present invention have a mean particle diameter in the range of 1 to 6 μm. The use of the fine particles with particle diameters in the above defined range can realize a synthetic leather having a matte surface which is best to the touch. The particle diameter of the fine particles is preferably 2 to 5 μm, more preferably 2.5 to 3.5 μm. When the particle diameter is less than 1 μm, it is difficult to perceive the surface as a matte surface. On the other hand, when the particle diameter exceeds 6 μm, hitches causative of the drop of particles are formed on the surface of the matte layer in the release sheet. Further, since fine particles are precipitated in the coating liquid for matte layer formation, the stability of the coating liquid is deteriorated.

Further, these porous fine particles preferably have been surface treated. More preferably, when the thermosetting resin is soluble in water, the surface treatment is inorganic surface treatment, while, when the thermosetting resin is nonaqueous, the surface treatment is organic surface treatment. The modification of the surface of the fine particles with an inorganic or organic material can improve the compatibility of the fine particles with the thermosetting resin which will be described later. In this case, even when the matte layer is formed on the substrate, the aggregation of the fine particles can be suppressed. When a coating liquid is prepared using the surface treated fine particles, the coating liquid has improved fluidity. Therefore, the incorporation of these fine particles in a desired amount in the coating liquid does not deteriorate the coatability of the coating liquid.

Organic materials usable herein include polyethylene waxes, paraffin waxes, and organosilicon compounds. Among them, organosilicon compounds are particularly preferred.

The matting agent comprising the porous fine particles is preferably contained in an amount of 5 to 50% by weight in the composition for matte layer formation. When the content of the matting agent in the composition is less than 5% by weight, the contemplated matte layer cannot be formed. On the other hand, when the content of the matting agent in the composition exceeds 50% by weight, the coatability of the composition onto the substrate is deteriorated and the formation of an even surface is disadvantageously difficult. The content of the matting agent in the composition is preferably 7 to 20% by weight, more preferably 10 to 15% by weight.

Examples of the thermosetting resin constituting the composition for matte layer formation according to the present invention include melamine resins such as alkyd resins, methylol melamine resins, and methoxymethylol melamine resins. These resins may be used as a proper mixture thereof. In order to suppress the so-called "drop of porous fine particles" in the release sheet, the use of melamine resin is preferred.

The composition for matte layer formation according to the present invention preferably comprises a release agent in addition to the above ingredients. When the composition contains the release agent, in the production of a synthetic leather using the release sheet, the release sheet can be easily separated from the synthetic leather. Further, the formed synthetic leather has a good surface state. The release agent is not particularly limited, and examples of release agents usable herein include silicones, alkyd resins, alkyd-silicone copolymers, or silicone-modified amino alkyd resins as disclosed in Japanese Patent Laid-Open No. 28242/1990, and mixtures of the above materials. The content of the release agent is preferably 0 to 60% by weight, more preferably 30 to 60% by weight. As the content of the release agent is increased, the synthetic leather can be easily separated from the release sheet. A release agent content exceeding 60% by weight, however, causes an excessive lowering in frictional resistance of the surface of the release sheet which is causative of winding loosing of a release sheet roll. Further, in the production of a synthetic leather, when a synthetic leather coating material is coated onto the release sheet, the coating material is repelled from the release sheet due to poor wettability of the release sheet by the coating material.

Next, the release sheet of the present invention produced using the above composition for matte layer formation and the production process thereof will be described.

FIG. 1 is a typical cross-sectional view showing a first embodiment of the release sheet for the production of a synthetic leather according to the present invention. The construction of a release sheet 10 shown in FIG. 1 is such that a smoothing layer 2 is provided on the upper surface of a substrate 1 and a matte layer 3 is provided on the smoothing layer 2.

According to this construction, the smoothness of the substrate can be improved by the smoothing layer. For example, when a material having a relatively rough surface such as paper or a nonwoven fabric is used as the substrate, the provision of a smoothing layer 2 between the substrate 1 and the matte layer 3 is preferred. When the surface of the substrate is smoothed, a smooth and even matte layer can be formed. As a result, in the production of a synthetic leather, it is possible to prevent the pattern present on the surface of the substrate from appearing as spots on the surface of the synthetic leather. Further, after the production of the synthetic leather, the release sheet can be easily separated from the synthetic leather without increasing the peeling resistance.

The smoothing layer can be formed using any composition without particular limitation. An example of a suitable composition for smoothing layer formation is a composition having the same formulation as the composition for matte layer formation except that the porous fine particles are absent. This composition can form a smoothing layer which has good adhesion to the matte layer and excellent peeling resistance. When the matte layer has a satisfactory thickness, the provision of the smoothing layer is not always necessary. Since, however, the formation of a thick matte layer results in deteriorated drying properties, the thickness of the matte layer is preferably as thin as possible so far as the thickness does not adversely affect the formation of fine concaves and convexes 4 on the surface of the matte layer. The formation of a thin matte layer, however, sometimes causes surface defects such as spotted dropouts. Therefore, the formation of the smoothing layer is preferred also from the viewpoint of compensating such defects.

When paper is used as the substrate, the smoothing layer may be a clay coating. In this case, the thickness of the smoothing layer is preferably about 20 to 40 µm, more preferably 20 to 30 µm. Since the clay coating can smooth the surface of the paper, a matte layer can be uniformly formed on the paper through the clay coating.

The composition for smoothing layer formation may contain a leveling agent. The incorporation of the leveling agent in the composition for smoothing layer formation can flatten concaves and convexes formed on the coated face (the surface of the smoothing layer formed on the substrate) with the elapse of time. The incorporation of the leveling agent in the composition for smoothing layer formation has such an additional effect that the occurrence of orange peel, wrinkling, pinholes, foaming, raising, cracking, cratering and the like on the coating surface can be prevented to smooth the surface.

The leveling agent is not particularly limited so far as the leveling agent used does not deteriorate the adhesion of the smoothing layer to the matte layer formed on the smoothing layer. Leveling agents usable herein include, for example, silicone resins, such as silicone oils and silicone-modified resins, and, in addition, polymeric materials called organic polymeric leveling agents. For example, when a silicone oil is used as the leveling agent, the silicone oil gathers on the surface of the coating to form a kind of a barrier layer. Therefore, the evaporation of the solvent becomes uniform, and the surface tension of the coating is lowered, leading to favorable effects. Since, however, the sole use of the silicone oil deteriorates post-adhesion, the combined use of the organic polymeric leveling agent and the silicone oil is preferred from the viewpoint of reducing the amount of the silicone oil added.

The organic polymeric leveling agent is not particularly limited so far as the organic polymeric leveling agent can be dissolved in the resin solution to lower the surface tension of the resolution and does not lower the post-adhesion. Examples of suitable organic polymeric leveling agents usable herein include polyvinyl butyral and low-molecular weight cellulose. The use of a mixture of these polymeric materials increases the viscosity of the coating liquid and suppresses rising of foams derived from dynamic viscosity and thus results in the formation of a smooth coating surface. The "post-adhesion" as used herein refers to the adhesion between the smoothing layer and the matte layer. When this adhesion is low, in the production of a synthetic leather, upon the separation of the release sheet from the synthetic leather, the matte layer, together with the synthetic leather, is disadvantageously separated from the smoothing layer.

For example, internally curable silicone resins or fluorocopolymer resins may also be used as the leveling agents, although these resins are inferior to the above polymeric leveling agents in the post-adhesion.

Internally curable silicone resins include silicone acrylates, and specific examples thereof include acrylsilanes and methacrylsilanes, acrylsilicones and methacrylsilicones, and phenylsilicone acrylate and m-phenylsilicone acrylate. More specific examples thereof include acrylsilanes such as acryloxypropylmethyldimethoxysilane and acryloxypropyltrimethoxysilane, and methacrylsilanes such as methacryloxypropylmethyldimethoxysilane, and methacryloxypropyltrimethoxysilane.

Further, the so-called "surfactant" or the like may be used as the organic polymeric leveling agent. Since, however, this function to lower the surface tension, solvents used are limited and, for example, aqueous coating, such as alcoholic or emulsion coating, is necessary.

When organic solvent systems are used, the above-described polymeric materials, silicone-modified copolymer resins, fluorocopolymer resins and the like may be used as the organic polymeric leveling agent. Specific examples thereof include Chaline Series manufactured by Nissin Chemical Industry Co., Ltd. Further, for example, Talen, Flowlen, and Polyflow, which are organic copolymers such as low-molecular weight cellulose, manufactured by Kyoeisha Chemical Co., Ltd. are also preferred.

Two or more organic polymeric leveling agents can also be used in combination. For example, the addition of an internally curable silicone in addition to a low-molecular weight cellulose can also provide good results.

The amount of the organic polymeric leveling agent added is preferably about 0.01 to 3% by weight based on the composition for smoothing layer formation. If the amount of the organic polymeric leveling agent added is less than 0.01% by weight, then the leveling effect cannot be attained, while if it exceeds 3% by weight, the post-adhesion is disadvantageously lowered.

FIG. 2 shows a second embodiment of the release sheet for the production of a synthetic leather according to the present invention. As shown in FIG. 2, the matte layer 3 has a multilayer structure of two or more layers, i.e., releasable resin layers (3a and 3b), and, among the layers constituting the multilayered matte layer, each of all the releasable resin layers 3a except for at least the layer 3b in contact with the surface of the substrate contains a release agent comprising a silicone-modified resin or a silicone-containing resin composition. In this case, as the layer is closer to the surface of the matte layer, the content of the release agent is increased.

When the formation of a matte layer having high smoothness by coating the resin with a silicone resin or the like added thereto and drying the coating is contemplated, the resin should be coated to a large thickness. Coating of the resin to a large thickness, however, deteriorates the drying properties of the coating. Acceleration of the drying by strong heating or the like for solving this problem deteriorates the smoothness of the matte layer. A solution to this problem is to form a multilayered matte layer. When the resin for matte layer formation contains a silicone-modified resin or a silicone, however, mere stacking of coatings formed using coating liquids having the same composition poses a problem that the receptivity or adhesion to later stacked layers for constituting the matte layer is deteriorated.

In the release sheet according to the present invention, as described above, the formation of a matte layer having a multilayer structure of releasable resin layers is advantageous in that, even when the formation of a thick matte layer is contemplated due to unsatisfactory smoothness of the substrate, the thickness of each of the layers constituting the matte layer can be made small and, in addition, the lower release layer can improve the smoothness, whereby a smooth matte layer can be efficiently formed without sacrificing the drying properties. Further, among the layers constituting the multilayered matte layer, all the releasable resin layers except for at least the innermost layer, that is, the outer releasable resin layers, contain a silicone-modified resin or silicone, and, in addition, as the releasable resin layer is closer to the outer surface of the matte layer, the content of the silicone-modified resin or silicone in the releasable resin layer is higher. Therefore, the adhesion between the releasable resin layers is not deteriorated.

What is required of the innermost layer constituting the multilayered matte layer is only to function as a smoothness improving layer, and the releasability is not required of the innermost layer. Therefore, the addition of the silicone-modified resin or silicone as the release agent to the innermost releasable resin layer is not necessary. That is, in the innermost releasable resin layer, the mixing ratio of the silicone-modified resin or silicone may be 0 (zero). Since, however, good leveling is necessary, the silicone-modified resin or silicone may be used as a leveling agent in a limited minor amount. When the silicone-modified resin or silicone is used as the leveling agent, the silicone-modified resin or silicone may be used in combination with the above leveling agent, or alternatively other leveling agents may be used instead of the silicone-modified resin or silicone.

The third embodiment of the release sheet for the production of a synthetic leather according to the present invention comprises: a matte layer having fine concaves and convexes on its surface; and a substrate for supporting the matte layer, said matte layer comprising a releasable resin layer, a releasable transparent resin being provided so as to stay on the bottom of the concaves in the concave-convex portion. The use of the release sheet having a matte layer in which a transparent resin stays on the bottom of the concaves in the concave-convex portion can realize the production of a synthetic leather which is finer to the touch, that is, has the so-called "peach skin-like" feel. Further, when the transparent resin is used, synthetic leathers with different colors or with a light color can be continuously produced without the influence of the color of the previously produced synthetic leather and the release sheet can be repeatedly used with safety.

FIG. 3 is a typical cross-sectional view of a principal part illustrating the step of allowing a part of a coated transparent synthetic resin layer to stay on the bottom of the concaves in the fine concave-convex portion on the surface of the releasable resin layer in the release sheet according to the present invention.

After a matte layer 3 is formed on a substrate 1, a transparent synthetic resin liquid is coated onto the matte layer 3 to form a coating which is then heat dried to form a transparent synthetic resin layer 5. The transparent synthetic resin layer 5 is then separated from the release sheet 10. Thus, a broken transparent synthetic resin 5' stays on the bottom of the concaves in the fine concaves and convexes 4 of the matte layer 3.

More specifically, a transparent synthetic resin liquid is coated onto the surface of the matte layer 3 in the release sheet 10. In this case, the synthetic resin liquid also enters the concaves in the fine concaves and convexes. The coating is brought into a film, for example, by heat drying to form a transparent synthetic resin layer 5. When the transparent synthetic resin layer 5 is then separated from the release sheet 10, the transparent synthetic resin layer 5, which has entered the concaves in the fine concaves and convexes, is broken partway because the peeling resistance at the time of separation is larger than the breaking strength. As a result, a transparent synthetic resin 5' remains unremoved on the bottom of the concaves (see FIG. 4). The broken face of the transparent synthetic resin 5' remaining unremoved is in an irregular and fine concave-convex form. Therefore, the whole surface of the matte layer 2 is in the form of fine concaves and convexes with different finesses which are suitable for imparting a peach skin-like feel to the surface of the synthetic leather. Accordingly, when a synthetic leather is produced using this release sheet, a peach skin-like feel can be imparted to the surface of the synthetic leather.

The resin used is not particularly limited. However, a part of the resin, which has entered the concaves, should be broken with proper breaking strength. To this end, for example, a resin composition having the same formulation as the resin composition for the formation of a skin layer in a synthetic leather except for the absence of the colorant can be suitably used. Specific examples of resin compositions usable herein include a polyurethane composition in a paste form for a polyurethane leather (hereinafter referred to simply as "PU leather"), in which additives other than the colorant may be contained and the solid content is about 20 to 50% by weight, and a polyvinyl chloride composition for a PVC leather, in which a PVC sol is generally used and, likewise, additives other than the colorant, for example, a plasticizer and a stabilizer, may be contained. The above synthetic resin may be coated by a conventional coating method such as knife coating, roll coating, or gravure coating. As shown in FIG. 5, the smoothing layer 2 as described above may also be provided between the matte layer and the substrate.

Papers such as kraft papers, wood free papers, and cast coated papers may be used as the substrate for supporting the smoothing layer and the matte layer. Other materials usable as the substrate include: films of plastics, for example, polyesters such as polyethylene terephthalate and polyethylene naphthalate, polyamides such as various nylons, and polypropylene; synthetic papers; metal foils; woven fabrics; and nonwoven fabrics. These materials may be used solely or as a proper laminate of two or more of them.

The substrate preferably has a surface resistivity ($\Omega$) of not more than $1.0 \times 10^{12}$. In particular, preferably, the substrate contains an organic polymeric conductive agent and/or an inorganic conductive agent, or has, on any one side thereof, a coating of the organic polymeric conductive agent and/or the inorganic conductive agent, and the content of the conductive agent is in the range of 0.05 to 3.00 g/m² based on the substrate.

When the resistivity of the substrate is in the above defined range, antistatic effect can be attained. That is, at the time of the formation of the matte layer and at the time of the production of a synthetic leather using the release sheet, cracking of the surface of the matte layer or of the synthetic leather by the occurrence of static electricity can be prevented.

A possible formulation of main materials for constituting the substrate is as follows. Regarding a pulp formulation, bleached kraft pulp of a broad-leaved tree (L-BKP) and bleached kraft pulp of a needle-leaved tree (N-BKP) are used as main pulp fibers, and waste stuff or waste paper pulp is properly mixed thereinto. Further, internal sizing agents, cationized starches, and antifoaming agents, such as fatty esters and special paraffins, and the like may be used as additives. In a substrate size press process, a size press liquid containing a corn starch, a surface sizing agent, a conductive agent and the like is coated onto a base paper. In this size press process, the size press liquid is coated on both sides of the substrate and is also impregnated into the substrate.

Conductive agents usable herein are organic polymeric conductive agents and/or inorganic conductive agents. Organic polymeric conductive agents include: nonionic polymers such as polyvinyl alcohol, polyacrylamide, and polyethylene glycol; anionic polar group-containing polymers such as sulfonated styrene resin; and cationic polymers, for example, quaternary ammonium salts such as quaternary ammonium chloride. Inorganic conductive agents include calcium oxide, sodium aluminate, zinc oxide, tin oxide, calcium chloride, lithium chloride, potassium chloride, magnesium chloride, sodium chloride, and carbon black.

The content of the conductive agent or the coverage of the conductive agent on the surface of the substrate may be in the range of 0.05 to 3.0 g/m², preferably in the range of 0.2 to 2.0 g/m². When the amount of the conductive agent is less than 0.05 g/m², the surface resistivity of the substrate is likely to exceed $1.0 \times 10^{12}$ $\Omega$ and, consequently, the antistatic effect is unsatisfactory. For this reason, at the time of the formation of the matte layer or at the time of the production of a synthetic leather using this type of release sheet, cracking occurs in the matte layer or the synthetic leather due to the generation of static electricity. On the other hand, when the amount of the conductive agent exceeds 3.0 g/m², a further improvement in the antistatic effect cannot be expected and, further, in this case, the material cost is disadvantageously increased.

On the other hand, when a plastic film or a metal foil is used as the substrate, the provision of the smoothing layer is unnecessary because the surface of the plastic film or metal foil is generally smooth. In some cases, however, the adhesion to the matte layer is unsatisfactory. In this case, the surface of the substrate may be subjected to easy-adhesion treatment such as corona discharge treatment or ozone treatment, or alternatively a primer coating or the like may be applied to the surface of the substrate.

A smoothing layer and a matte layer are formed on the substrate. In the formation of the smoothing layer, the composition for smoothing layer formation is provided as a coating liquid, and the coating liquid is coated, for example, by a coating method such as bar coating, air doctor coating, blade coating, squeeze coating, air knife coating, roll coating, gravure coating, transfer coating, Komma coating, smoothing coating, microgravure coating, reverse roll coating, multiroll coating, dip coating, rod coating, kiss coating, gate roll coating, drop curtain coating, slide coating, fountain coating, or slit die coating. After the coating liquid is coated, the coating is dried and solidified to form a smoothing layer. Next, the composition for matte layer formation is provided as a coating liquid and may be coated in the same manner as described above to form a matte layer.

In the release sheet thus produced, the thickness of the smoothing layer is preferably 0.5 to 10 g/m² in terms of coverage after drying of the coating. If the thickness of the smoothing layer is less than 0.5 g/m², then the contemplated effect of the smoothing layer cannot be expected. On the other hand, a thickness of more than 10 g/m² causes a lowering in drying speed and processing speed and is also disadvantageous from the viewpoint of cost.

The thickness of the matte layer is preferably in the range of 1.0 to 20 g/m² in terms of coverage after drying of the coating. If the thickness of the matte layer is less than 1.0 g/m², then the formation of an even coating is difficult. Coating to a larger thickness is preferred from the viewpoint of providing a satisfactorily matte surface or from the viewpoint of releasability. A thickness exceeding 20 g/m², however, causes a lowering in drying speed and processing speed and is also disadvantageous from the viewpoint of cost.

In the release sheet thus obtained, a fine concave-convex portion 4 is formed on the surface of the matte layer, and the arithmetical mean roughness (Ra) of the matte surface is 0.5 to 15 μm. More preferably, the mean spacing of profile irregularities (concaves and convexes) (Sm) in the concave-convex portion on the surface of the matte layer is 0.5 to 10 μm.

In the release sheet in which a transparent resin is provided so as to stay in the concaves, preferably, the concave-convex portion has an arithmetical mean roughness (Ra) of 0.5 to 15 μm, the mean spacing of profile irregularities (concaves and convexes) (Sm) in the concave-convex portion is 0.5 to 10 μm, and the mean inclination (θa) of the concaves and convexes is 45 degrees ≦θa <90 degrees. The arithmetical mean roughness (Ra) of the fine concaves and convexes and the mean spacing of profile irregularities (concaves and convexes) (Sm) are values measured based on JIS B 0601-1994 "Surface roughness—Definitions and designation" under the following measuring conditions.

Measuring Conditions

Tip radius of stylus: load 5 μm: cut-off value 4 mN: standard value described in Table 1 is selected.

Reference length: standard value described in Table 2 is selected.

Measuring instrument: surface roughness measuring device Suftest-201, manufactured by MITUTOYO CORPORATION

TABLE 1

| Ra range, μm | Cut-off value λc, mm | Evaluation length Ln, mm |
|---|---|---|
| 0.006 < Ra ≦ 0.02 | 0.08 | 0.4 |
| 0.02 < Ra ≦ 0.1 | 0.25 | 1.25 |
| 0.1 < Ra ≦ 2.0 | 0.8 | 4.0 |
| 2.0 < Ra ≦ 10.0 | 2.5 | 12.5 |
| 10.0 < Ra ≦ 80.0 | 8.0 | 40.0 |

TABLE 2

| Sm range, μm | Reference length L, mm | Evaluation length Ln, mm |
|---|---|---|
| 0.013 < Sm ≦ 0.04 | 0.08 | 0.4 |
| 0.04 < Sm ≦ 0.13 | 0.25 | 1.25 |
| 0.13 < Sm ≦ 0.4 | 0.8 | 4.0 |
| 0.4 < Sm ≦ 1.3 | 2.5 | 12.5 |
| 1.3 < Sm ≦ 4.0 | 8.0 | 40.0 |

A synthetic leather can be produced using the above release sheet by conventional paste coating method (vinyl chloride leather method; hereinafter referred to as "PVC leather method") or dry method (polyurethane leather method; hereinafter referred to as "PU leather method").

Specifically, a synthetic leather with fine concaves and convexes being formed on the surface thereof can be produced by coating a resin composition for a skin layer in a synthetic leather onto the surface of a matte layer in the release sheet, drying the coating by heating to form a film as the skin layer, then laminating a backing fabric onto the skin layer with the aid of an adhesive, drying and aging the assembly, and then separating the release sheet.

For example, in the formation of the PVC leather, a PVC paste, wherein polyvinyl chloride is used as a main component and a plasticizer, a foaming agent, a stabilizer, a colorant and the like have been properly added to polyvinyl chloride, may be used as the resin composition for a skin layer in the synthetic leather. In the formation of the PU leather, a composition having a solid content of about 20 to 50% by weight prepared by optionally adding a colorant and other additives to a polyurethane solution may be used. The above composition for skin layer formation may be coated by conventional coating means such as knife coating, roll coating, reverse roll coating, or gravure coating.

The synthetic leather produced by the above method is a matte synthetic leather which has a matte surface with a high level of jet-blackness without the practice of embossing, raising or the like. Further, since the surface shape of the release sheet is transferred onto the surface of the synthetic leather, the surface of the synthetic leather has an arithmetical roughness (Ra) of 0.5 to 15 μm and a glossiness in the range of 0.5 to 10% as measured in 85-degree incidence/85-degree reflection.

Further, the synthetic leather produced using the release sheet with a transparent resin staying in the concave portion of the matte layer has on its surface a releasable transparent resin layer. Therefore, the surface of the synthetic leather has a peach skin-like feel and, at the same time, is less likely to be soiled and, even when soiled, can be easily cleaned because the soil can be easily removed.

The following examples further illustrate the present invention but are not intended to limit it. It should be noted that any technical idea, which has constitution and function and effect substantially identical to that described in claims of the present invention, are embraced within the technical scope of the present invention.

EXAMPLES

Examples 1 to 3

A cast coated paper having a basis weight of 155 g/m² manufactured by Oji Paper Co., Ltd. was provided as a substrate. A coating liquid for smoothing layer formation having the following composition was roll coated onto the cast coated face at a coverage of 5 g/m² on a dry basis, and the coating was dried by heating at 160° C. for one min or longer to form a smoothing layer.

Composition of Coating Liquid for Smoothing Layer Formation

| | |
|---|---|
| Melamine resin (Melan 28, manufactured by Hitachi Chemical Co., Ltd.) | 220 pts. wt. |
| Alkyd resin (Phthalkyd 133-60, manufactured by Hitachi Chemical Co., Ltd.) | 100 pts. wt. |
| Acid catalyst (p-toluenesulfonic acid) | 8.4 pts. wt. |
| Solvent (toluene/n-butyl alcohol: weight ratio = 1/1) | 980 pts. wt. |

Next, coating liquids for matte layer formation having the following compositions containing various types of silica shown in Table 3 were roll coated onto the smoothing layer at a coverage of 10 g/m² on a dry basis, and the coatings were dried by heating at 180° C. for one min or longer to form matte layers. Thus, release sheets of Examples 1 to 3 were prepared.

Coating Liquid for Matte Layer Formation

| | |
|---|---|
| Methylolated melamine resin | 50 pts. wt. |
| Silicone-modified alkyd resin | 50 pts. wt. |
| Acid catalyst (p-toluenesulfonic acid) | 4.2 pts. wt. |
| Porous fine particles (silica: see Table 2) | 10 pts. wt. |
| Solvent (toluene/n-butyl alcohol: weight ratio = 1/1) | 500 pts. wt. |

Figure 6:
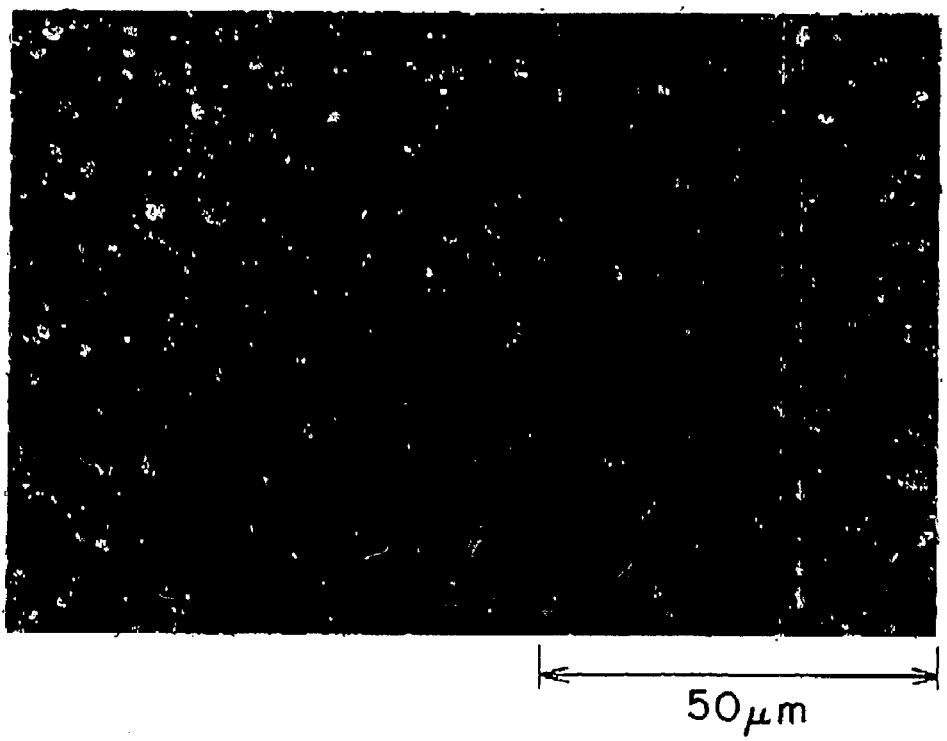
FIG. 6 is an electron photomicrograph of the surface of a release sheet for the production of a synthetic leather prepared in Example 1.

The coating liquids for matte layer formation, when coated on the smoothing layer, could be evenly coated without cissing, and, upon curing by heating, each of the coatings could form a smoothing layer having good adhesion to the matte layer. FIG. 6 shows an electron photomicrograph of the surface of the release sheet produced in Example 1.

For the release sheets of Examples 1 to 3 thus prepared, the arithmetical mean roughness (Ra) of the surface of the matte layer is shown in Table 3.

The following two synthetic leathers, a PVC leather and a PU leather, were prepared using the release sheets of Examples 1 to 3 thus obtained.

Preparation of Matte PVC Leather

A PVC composition (paste), for the formation of a skin layer in a synthetic leather, prepared by mixing 100 parts by weight of a PVC resin (molecular weight 1,000), 60 parts by weight of a plasticizer DOP, 5 parts by weight of a foaming agent, 2.5 parts by weight of a stabilizer, and 15 parts by weight of a colorant (SEIKASEVEN NET-5794 Black, manufactured by Dainichiseika Color & Chemicals Manufacturing Co., Ltd.) together was knife coated onto the surface of the matte layer in the release sheet of Example 1 at a coverage of 150 g/m² on a dry basis. The coating was dried by heating at 190 to 200° C. for 2 min or longer. Thereafter, a backing fabric was applied onto the dried coating with the aid of an adhesive, and the laminate was dried and aged. The release sheet was then separated and removed to prepare a PVC leather 1.

Figure 7:
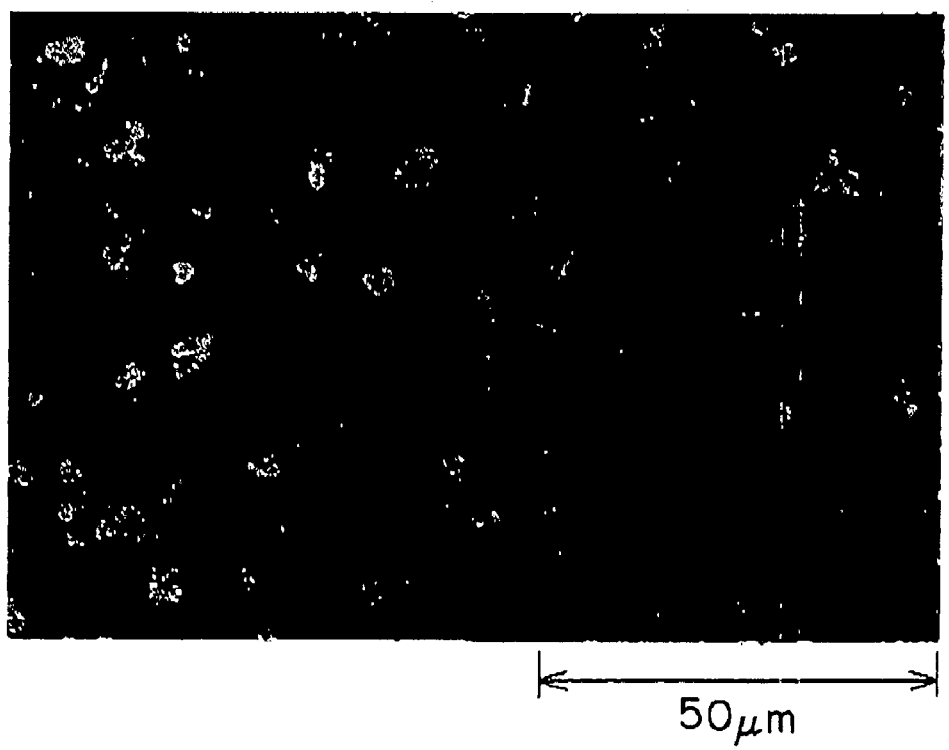
FIG. 7 is an electron photomicrograph of the surface of a PVC leather 1 prepared in Example 1.

The PVC leather 1 thus obtained could be easily separated from the release sheet without significant peeling resistance and had a matte surface with a high level of jet-blackness. The glossiness of the PVC leather thus obtained was measured under conditions of 85-degree incidence/85-degree reflection. The results of the measurement of surface glossiness of the PVC leather are shown in Table 3. FIG. 7 shows an electron photomicrograph of the surface of the PVC leather 1 prepared in Example 1.

Preparation of Matte PU Leather

A PU composition (paste), for the formation of a skin layer in a synthetic leather, prepared by mixing 100 parts by weight of polyurethane (Resamine NE-8811, manufactured by Dainichiseika Color & Chemicals Manufacturing Co., Ltd.), 15 parts by weight of a colorant (SEIKASEVEN NET-5794 Black, manufactured by Dainichiseika Color & Chemicals Manufacturing Co., Ltd.), 25 parts by weight of toluene, and 25 parts by weight of isopropyl alcohol together was knife coated onto the surface of the matte layer in the release sheet of Example 1 at a coverage of 150 g/m² on a dry basis. The coating was dried by heating at 100 to 120° C. for 2 min or longer. Thereafter, a backing fabric was applied onto the dried coating with the aid of an adhesive, and the laminate was dried and aged. The release sheet was then separated and removed to prepare a PU leather 1.

The PU leather 1 thus obtained could be easily separated from the release sheet without significant peeling resistance and had a matte surface with a high level of jet-blackness. Even after the repetition of the preparation of the PU leather 1 three times or more, the leather had the same matte surface as in the first preparation of the synthetic leather.

Comparative Examples 1 and 2

Release sheets were prepared in the same manner as in Example 1, except that fine particles shown in Table 3 were used instead of the porous fine particles used in the coating liquid for matte layer formation in Example 1. Synthetic leathers were prepared in the same manner as in Example 1, except that the release sheets prepared just above were used. The arithmetical mean roughness (Ra) of the release sheets thus obtained and the glossiness of the PVC leathers produced using the release sheets were measured, and the results are shown in Table 3.

TABLE 3

| | Fine particles (silica) | | | Release sheet | |
|---|---|---|---|---|---|
| | Particle diameter, μm | Specific surface area, m²/g | Surface treatment | Surface roughness Ra, μm | PVC leather Glossiness, % |
| Ex. 1 | 2.5 | 150 | Organic | 2.0 | 1.2 |
| Ex. 2 | 1.0 | 200 | Organic | 1.0 | 1.1 |
| Ex. 3 | 10.0 | 60 | Organic | 10.2 | 1.6 |
| Comp. Ex. 1 | 2.5 | 1500 | Organic | 2.1 | 17.0 |
| Comp. Ex. 2 | 2.5 | 0.1 | Inorganic | 1.7 | 20.0 |

Example 4

Preparation of PVC Leather having Combination of Matte Tone with Peach Skin Tone

A release sheet 4 was prepared in quite the same manner as in Example 1, except that a mixture of 10 parts by weight of silica, which had been subjected to organic surface treatment and had a mean particle diameter of 5.2 µm (specific surface area: 340 to 350 m$^2$/g) (SYLYSIA 456, manufactured by Fuji Silysia Chemical Ltd.), with 10 parts by weight of silica which had been subjected to organic surface treatment and had a mean particle diameter of 2.5 µm (specific surface area: 340 to 350 m$^2$/g) (SYLYSIA 436, manufactured by Fuji Silysia Chemical Ltd.) was used as the porous fine particles. Skin layers for a synthetic leather were formed on the surface of the matte layer in the release sheet 4 as follows. At the outset, a PVC composition (paste) prepared by mixing 100 parts by weight of PVC (molecular weight 1,000), 60 parts by weight of a plasticizer (DOP), and 1 (one) part by weight of a water-dispersed silicone release agent (amino-modified silicone) together was gravure coated at a coverage of 2 g/m$^2$ on a dry basis, and the coating was dried. Next, a PVC composition (paste), for skin layer formation in a synthetic leather, prepared by mixing 100 parts by weight of a PVC resin (molecular weight 1,000), 60 parts by weight of a plasticizer DOP, 5 parts by weight of a foaming agent, 2.5 parts by weight of a stabilizer, and 15 parts by weight of a colorant (SEIKASEVEN NET-5794 Black, manufactured by Dainichiseika Color & Chemicals Manufacturing Co., Ltd.) together was knife coated thereon at a coverage of 150 g/m$^2$ on a dry basis, and the coating was then dried by heating at 190 to 200° C. for 2 min or longer. Thereafter, a backing fabric was applied onto the dried coating with the aid of an adhesive, and the laminate was dried and aged. The release sheet was then separated and removed to prepare a PVC leather 4.

The PVC leather 4 thus obtained had a releasable thin transparent PVC resin layer on its surface, and the surface thereof was a fine touch surface having a combination of a matte tone with a peach skin tone. After the separation of the release sheet, the PVC transparent resin remained unremoved on the bottom of the concaves in the fine concave-convex portion on the surface of the release sheet, and the colored PVC (PVC leather side) resin was not transferred onto and was absent on the release sheet side.

The preparation of PVC leather with different colors was repeated five times using the release sheet in Example 4 in the same manner as in Example 4. As a result, the release sheet could be easily separated from the synthetic leather without significant peeling resistance. Further, since the release sheet could be continuously used without the transfer of the colored PVC resin in the leather skin layer onto the release sheet, PVC leathers having an excellent matte surface could be efficiently produced.

Example 5

Preparation of PU Leather having Combination of Matte Tone with Peach Skin Tone

Skin layers for a synthetic leather were formed on the surface of the matte layer in the same release sheet as prepared in Example 4 as follows. At the outset, a coating liquid prepared by mixing 100 parts by weight of a polyurethane composition (Resamine NE-8811, manufactured by Dainichiseika Color & Chemicals Manufacturing Co., Ltd.), 0.5 part by weight of a silicone release agent (amino-modified silicone), 0.5 part by weight of epoxy-modified silicone, and 25 parts by weight of toluene and 25 parts by weight of isopropyl alcohol (hereinafter referred to as "IPA") as solvents together was gravure coated on the surface of the matte layer at a coverage of 1.5 g/m$^2$ on a dry basis, and the coatings were then dried. Next, a PU composition (black colored paste), for the formation of a skin layer in a synthetic leather, prepared by mixing 100 parts by weight of polyurethane (Resamine NE-8811, manufactured by Dainichiseika Color & Chemicals Manufacturing Co., Ltd.), 15 parts by weight of a colorant (SEIKASEVEN NET-5794 Black, manufactured by Dainichiseika Color & Chemicals Manufacturing Co., Ltd.), 25 parts by weight of toluene, and 25 parts by weight of IPA together was knife coated thereon at a coverage of 150 g/m$^2$ on a dry basis, and the coating was dried by heating at 100 to 120° C. for 2 min or longer. Thereafter, a backing fabric was applied onto the dried coating with the aid of an adhesive, and the laminate was dried and aged. The release sheet was then separated and removed to prepare a PU leather 5.

The PU leather 5 thus obtained had a releasable thin transparent PU resin layer on its surface, and, as with the synthetic leather prepared in Example 4, the PU leather 5 had a surface with a combination of a matte tone having a high level of jet-blackness with a peach skin tone. After the separation of the release sheet, the PU transparent resin remained unremoved on the bottom of the concaves in the fine concave-convex portion on the surface of the release sheet, and the colored PU (PU leather side) resin was not transferred onto and was absent on the release sheet side.

The preparation of PU leather with different colors was repeated five times using the release sheet in Example 5 in the same manner as in Example 5. As a result, the release sheet could be easily separated from the synthetic leather without significant peeling resistance. Further, since the release sheet could be continuously used without the transfer of the colored PU resin in the leather skin layer onto the release sheet, PU leathers having an excellent matte surface could be efficiently produced.

Example 6

A release sheet 6 was prepared in quite the same manner as in Example 1, except that 40 parts by weight of silica, which had been subjected to organic surface treatment and had a mean particle diameter of 5.2 µm (specific surface area: 340 to 350 m$^2$/g) (SYLYSIA 456, manufactured by Fuji Silysia Chemical Ltd.), was used as the porous fine particles.

Fine concaves and convexes formed on the surface of the matte layer in the release sheet 6 had an arithmetical mean roughness (Ra) of 0.54 µm, a mean profile irregularity spacing (Sm) of 9 µm, and a mean inclination (θa) of 47 degrees and were good as fine concaves and convexes for imparting peach skin-like appearance and touch to the surface of the synthetic leather.

A PU leather with a skin layer having a two-layer structure of a releasable thin transparent resin layer provided on the surface side and a colored resin layer provided on the inner layer side was prepared as follows. At the outset, a coating liquid prepared by mixing 100 parts by weight of a polyurethane composition (Resamine NE-8811, manufactured by Dainichiseika Color & Chemicals Manufacturing Co., Ltd.), 0.5 part by weight of a silicone release agent (amino-modified silicone), 0.5 part by weight of epoxy-modified silicone, and 25 parts by weight of toluene and 25 parts by weight of IPA as solvents together was gravure coated on the surface of the matte layer in the release sheet 6 at a coverage of 2.0 g/m$^2$ on a dry basis, and the coatings were then dried. Next, a PU composition (red colored paste), for the formation of a skin layer in a synthetic leather, prepared by mixing 100 parts by weight of polyurethane (Resamine NE-8811, manufactured by Dainichiseika Color & Chemicals Manufacturing Co., Ltd.), 15 parts by weight of a colorant (SEIKASEVEN NET-5194 Red, manufactured by Dainichiseika Color & Chemicals Manufacturing Co., Ltd.), 25 parts by weight of toluene, and 25 parts by weight of IPA together was knife coated thereon at a coverage of 150 g/m² on a dry basis, and the coating was dried by heating at 100 to 120° C. for 2 min or longer. Thereafter, a backing fabric was applied onto the dried coating with the aid of an adhesive, and the laminate was dried and aged. The release sheet was then separated and removed to prepare a PU leather 6.

In the PU leather 6 thus obtained, the skin layer had such a construction that a releasable thin transparent PU resin layer was provided on the upper surface of a colored PU resin layer. By virtue of this construction, the PU leather 6 had unique soft color impression and had good peach skin-like appearance and feel. After the separation of the release sheet, the PU transparent resin remained unremoved on the bottom of the concaves in the fine concave-convex portion on the surface of the release sheet, and the colored PU (PU leather side) resin was not transferred onto and was absent on the release sheet side.

The preparation of PU leather with different colors was repeated five times using the release sheet in Example 5 in the same manner as in Example 5. As a result, the release sheet could be easily separated from the synthetic leather without significant peeling resistance. Further, since the release sheet could be continuously used without the transfer of the colored PU resin in the leather skin layer onto the release sheet, PU leathers having an excellent matte surface could be efficiently produced.

What is claimed is:

1. A release sheet for production of a synthetic leather, the release sheet comprising:
   a matte layer formed by coating a composition for matte layer formation comprising a thermosetting resin and a matting agent as indispensable components, the matting agent comprising at least one of organic and inorganic porous fine particles, the porous fine particles having a mean particle diameter of from 0.5 to 20 μm and a specific surface area of from 1 to 1000 m²/g; and
   a substrate for supporting the matte layer;
   wherein:
   the matte layer has a fine concave-convex portion on its surface, the concave-convex portion having an arithmetical mean roughness (Ra) of 0.5 to 15 μm; and
   a smoothing layer is provided between the matte layer and the substrate, the smoothing layer comprising a leveling agent.

2. The release sheet according to claim 1, wherein the smoothing layer is formed using a thermosetting resin composition.

3. The release sheet according to claim 1, wherein the substrate has a surface resistivity (Ω) of not more than $1.0 \times 10^{12}$.

4. The release sheet according to claim 1, wherein:
   the substrate contains an organic polymeric conductive agent and/or an inorganic conductive agent, or has, on any one side thereof, a coating of the organic polymeric conductive agent and/or the inorganic conductive agent; and
   the conductive agent is present in an amount of from 0.05 to 3.00 g/m² based on the substrate.

5. A release sheet for production of a synthetic leather, the release sheet comprising:
   a matte layer having fine concaves and convexes on its surface; and
   a substrate for supporting the matte layer;
   wherein:
   the matte layer comprises a transparent releasable resin layer that is formed by coating a transparent resin liquid onto the matte layer to form a coating, heat drying the coating to form a transparent resin layer, and separating the transparent resin layer from the release sheet in a manner leaving a broken transparent resin on the bottom of the concaves in the concave-convex portion of the matte layer; and
   a smoothing layer is provided between the matte layer and the substrate, the smoothing layer comprising a leveling agent.

6. The release sheet according to claim 5, wherein:
   the concave-convex portion has an arithmetical mean roughness (Ra) of from 0.5 to 15 μm;
   a mean spacing of profile irregularities (concaves and convexes) (Sm) in the concave-convex portion is from 0.5 to 10 μm; and
   a mean inclination (θa) of the concaves and convexes is 45 degrees ≦ θa < 90 degrees.

7. The release sheet according to claim 5, wherein:
   the releasable resin layer is formed by coating a composition for matte layer formation comprising a thermosetting resin and a matting agent as indispensable components, the matting agent comprising at least one of organic and inorganic porous fine particles, and
   the porous fine particles have a mean particle diameter of from 0.5 to 20 μm and a specific surface area of from 1 to 1000 m²/g.

8. A release sheet for production of a synthetic leather, the release sheet comprising:
   a matte layer formed by coating a composition for matte layer formation comprising a thermosetting resin, a release agent, and a matting agent as indispensable components, the matting agent comprising at least one of organic and inorganic porous fine particles, the porous fine particles having a mean particle diameter of from 0.5 to 20 μm and a specific surface area of from 1 to 1000 m²/g; and
   a substrate for supporting the matte layer;
   wherein:
   the matte layer is a releasable resin layer having a multilayer structure of at least two layers;
   all the releasable resin layers constituting the multilayered matte layer, except for at least a layer in contact with the substrate, contain a release agent comprising a silicone-modified resin or a silicone-containing resin composition;
   a content of the release agent in the releasable resin layers is greater in releasable resin layers that are closer to a surface of the matte layer; and
   all the releasable resin layers constituting the multilayered matte layer, except for at least a layer in contact with the substrate, further comprise a leveling agent.

* * * * *